(12) United States Patent
Almkvist et al.

(10) Patent No.: US 6,536,850 B2
(45) Date of Patent: Mar. 25, 2003

(54) METHOD OF CONTROLLING VACUUM

(75) Inventors: Göran Almkvist, Lerum (SE); Marcus Maxvall, Pixbo (SE); Henrik Green, Göteborg (SE); Olle Fast, Ytterby, MA (US)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,635

(22) Filed: May 14, 2001

(65) Prior Publication Data

US 2002/0013196 A1 Jan. 31, 2002

(51) Int. Cl.$^7$ ................................................. B60T 8/42
(52) U.S. Cl. ................................. 303/115.3; 303/114.1; 303/155
(58) Field of Search ............................. 303/155, 114.1, 303/115.3

(56) References Cited

U.S. PATENT DOCUMENTS

| | | | | |
|---|---|---|---|---|
| 4,096,696 A | * | 6/1978 | Van House | 60/547 |
| 4,224,791 A | | 9/1980 | Ostwald | |
| 4,738,112 A | * | 4/1988 | Nomura et al. | 60/721 |
| 4,750,790 A | * | 6/1988 | Klein | 303/114.3 |
| 4,778,225 A | * | 10/1988 | Rudolph et al. | 303/114.3 |
| 4,899,708 A | * | 2/1990 | Jung | 123/331 |
| 5,091,857 A | * | 2/1992 | Katayama et al. | 364/431.09 |
| 5,332,056 A | * | 7/1994 | Niibe et al. | 180/169 |
| 5,632,533 A | * | 5/1997 | Kullmann et al. | 303/122.05 |
| 5,846,164 A | * | 12/1998 | Harada | 303/114.3 |
| 5,950,594 A | * | 9/1999 | Mizuno | 123/295 |
| 5,950,595 A | * | 9/1999 | Yoshioka et al. | 123/295 |
| 6,017,100 A | * | 1/2000 | Mizuno et al. | 303/114.3 |
| 6,095,116 A | * | 8/2000 | Matsushita et al. | 303/114.3 |
| 6,305,757 B1 | * | 10/2001 | Ohsaki et al. | 303/114.3 |

FOREIGN PATENT DOCUMENTS

| | | |
|---|---|---|
| DE | 4202393 A1 | 8/1993 |
| EP | 0816196 A2 | 1/1998 |
| EP | 0833044 A2 | 4/1998 |
| EP | 081696 A2 A3 | 9/1998 |
| JP | 05213182 A | 8/1993 |
| WO | WO 9954613 A1 | 10/1999 |

* cited by examiner

Primary Examiner—Christopher P. Schwartz
Assistant Examiner—Devon Kramer
(74) Attorney, Agent, or Firm—Howrey, Simon, Arnold & White, LLP

(57) ABSTRACT

A method for controlling vacuum in an intake conduit of a combustion engine in a vehicle is provided. The vehicle is provided with a brake booster and an actuator for actuating the brake booster. Actuation of the brake booster causes a throttle valve in the intake conduit to close creating a vacuum to the brake booster.

15 Claims, 1 Drawing Sheet

METHOD OF CONTROLLING VACUUM

BACKGROUND OF INVENTION

1. Technical Field

The invention relates to a method for controlling vacuum in an intake conduit in a combustion engine of a vehicle wherein actuation of the brake booster closes a throttle in the intake conduit to provide the brake booster with vacuum.

2. Background of Related Art

Modern vehicles normally use a brake booster connected to the brake pedal in the brake circuit of the vehicle in order to amplify the pressure that is required for actuating the brakes. When a driver actuates the brake pedal, the brake booster supplies an hydraulic pressure corresponding to the actuating force applied to the pedal by the driver to the brake circuits of the vehicle, thereby actuating the brake calipers or drums of the vehicle. The brake booster is controlled by a source of vacuum. This source is usually the intake conduit of the engine of the vehicle.

The intake conduit is provided with a throttle valve that is controlled by an accelerator pedal via an engine control system. The throttle valve controls the amount of air supplied to the cylinders. It also cooperates with the fuel injection system to control the air/fuel ratio needed for a required power output. The vacuum required for the brake booster is taken from a position downstream of the throttle valve.

Under certain running conditions, such as a cold start combined with a high load or during stratified combustion with the throttle wide open, the vacuum downstream of the throttle valve may not be sufficient for proper operation of the brake booster. It is therefore a problem to provide a sufficient vacuum to the brake booster under all operating conditions of the engine.

One solution to this problem is shown in EPO 833,044-A2 wherein a sensor is used for monitoring the vacuum in the brake booster. When a pressure level is detected at which the vacuum is insufficient for actuation of the brake booster, the engine will switch from stratified to homogenous combustion. This will cause the throttle to be controlled to create a vacuum in the intake conduit. A drawback of this solution is that the engine will switch between different operating conditions as soon as the pressure in the brake booster passes a set level, whether it is required or not.

A further solution is shown in WO 99/54,613-A1. According to this solution, when an actuation of the brake pedal is detected, a counter starts measuring the period of time that the pedal is being actuated. If the period exceeds a set time, the engine is switched from a lean to a rich air/fuel ratio causing the throttle to be controlled so that a vacuum is created in the intake conduit. A problem with this solution, however, is that there is a delay between the actuation of the brake pedal and the switching between operating conditions of the engine. This causes a corresponding delay before a vacuum can be supplied to the brake booster.

Other known solutions use specially provided air pumps, operated separately from the engine to supply a vacuum for the brake booster. This requires the mounting of an additional pump on the vehicle. This pump must be driven by the engine, requires additional space, and is an extra cost to be added to the manufactured product.

SUMMARY OF INVENTION

The present invention solves the above problems by providing a method using direct control by demand. The goal is to switch the engine between different operating conditions only when the brake pedal is actuated.

The present invention relates to a method for controlling the vacuum in an intake conduit of a combustion engine in a vehicle that is provided with a brake booster and a pedal for actuating the booster. Actuation of the brake pedal when the engine is operated with stratified combustion will control the throttle valve in the intake conduit to create a vacuum for the brake booster. The throttle valve is controlled to close instantly, for example within a few tenths of a second, in order to create a vacuum in the intake conduit as quickly as possible.

When the driver actuates the brake pedal, an electrical signal is generated for controlling the throttle valve via a control unit. This can be achieved either by closing an electrical contact as soon as the pedal begins to move, or by using the signal that is generated by the actuation of an electrically controlled brake pedal that has no mechanical connection with the brake booster and its associated master brake cylinder. The throttle valve is preferably electrically controlled by an electronic control unit. This control unit is either connected to, or integrated with the engine control system.

As soon as the vacuum in the brake booster has reached a predetermined level, or when the electrical signal indicating brake pedal actuation ceases, the throttle valve can be opened.

The method may be used under several different operating conditions where the vacuum in the intake conduit is insufficient. One such operating condition is cold starting, when the emissions of, for instance, hydrocarbons ("HC") from the engine reaches their highest level. In order to heat a catalytic converter in the exhaust system quickly, it is desirable to increase the engine load by opening up the throttle and leaving it open. The result can be that the vacuum in the intake conduit is too low to give the necessary brake servo effect. If not acted upon, this could cause a loss of a major part of the braking effect during start-up.

As a rule, the vehicle brakes are not operated immediately after the engine is started. The supply of vacuum to the brake booster may therefore be delayed until the need arises. Hence the warm-up cycle of the engine and the catalytic converter can proceed without interference for a longer period of time. This will help reduce the emissions of HC and other pollutants.

By connecting the control unit to a speed sensor and sensors for the brake anti-locking system (ABS), a further embodiment enables the warm-up cycle of the engine and the catalytic converter to continue undisturbed as the procedure is only performed when the vehicle is moving or if the anti-locking system is activated. The latter may occur for instance if the vehicle anti-slip system uses the ABS-system to brake one or more wheels.

When the driver actuates the brake pedal and the procedure is started, the engine control unit must make sure that the drivability of the vehicle does not deteriorate due to such things as misfire and variations in engine speed. As the throttle valve starts to close, it is necessary to adjust the ignition timing and/or the amount of injected fuel.

DETAILED DESCRIPTION

Figure 1:
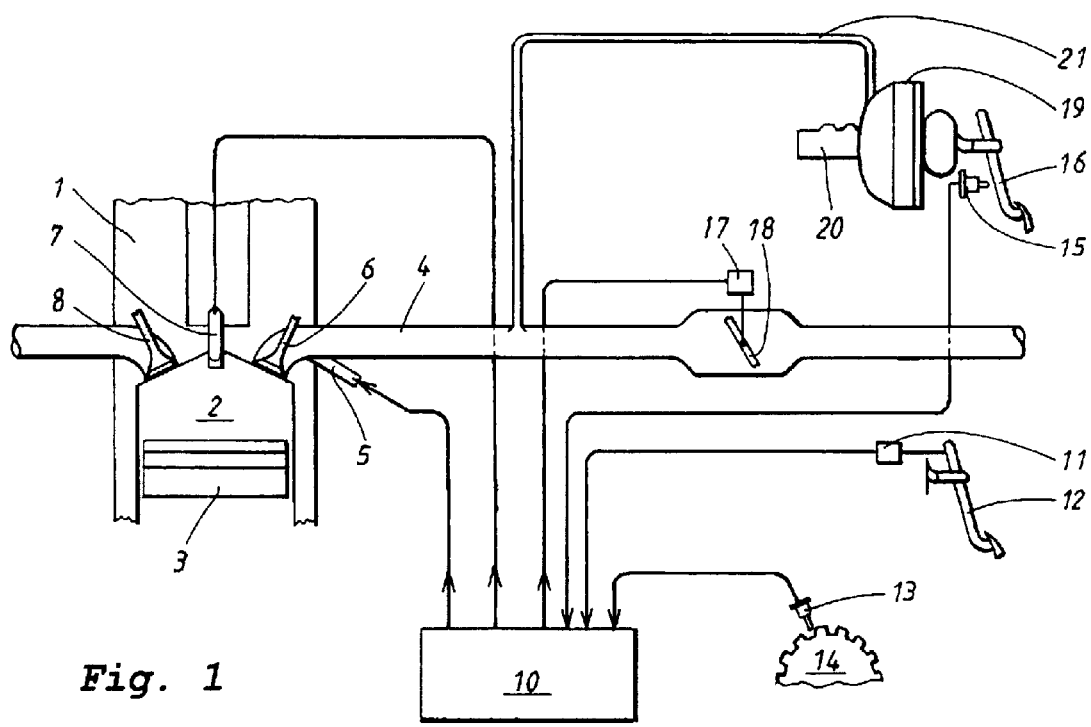
FIG. 1 shows a schematic system for generating a vacuum for a brake booster on demand.

Referring to the figures, FIG. 1 shows an embodiment of the invention including an engine 1 having at least one cylinder 2 with an associated piston 3. Air is supplied through an intake conduit 4 and is mixed with fuel from an injection system having a nozzle 5, whereby the mixture passes through an intake valve 6 and into the cylinder 2. After compression, the mixture is ignited by an ignition system having a spark plug 7, after which the combusted gases are pushed out through an exhaust valve 8.

The engine is controlled by a control unit 10 that receives signals from several sensors, such as a sensor 11 connected to the accelerator pedal 12, one or more sensors 13 measuring the rotational speed of one or more vehicle wheels 14 and a contact or sensor 15 detecting the actuation of the brake pedal 16. After having evaluated the signals from these sensors, the control unit 10 sends control signals to the injection system 5, the ignition system 7, and a control unit 17 for a throttle valve 18 in the intake conduit 4. The control unit 17 for the throttle valve preferably includes an electric motor for maneuvering the valve 18.

The brake pedal 16 is connected to a brake booster 19 that will amplify the force applied to the brake pedal upon actuation by the driver. The amplified pressure acts on a master brake cylinder 20 that supplies hydraulic pressure to the brake circuits (not shown) of the vehicle. The pressure amplifying effect is achieved by utilization of a membrane in the brake booster, which membrane is acted upon by a vacuum when the brake pedal 16 is actuated. The vacuum is obtained by connecting the brake booster 19 to the intake conduit 4 using a pipe 21.

The example shows a brake pedal that is mechanically connected to the brake booster, although a brake pedal using electrical control may be used. The contact 15 in FIG. 1 will then be replaced by a sensor, which will indicate both actuation and current position of the pedal to the control unit 10. A signal indicating the position of the brake pedal is transmitted to an electrically controlled and/or actuated brake booster, which will supply the desired pressure to the brake circuits.

Under normal operation of the vehicle, vacuum will exist in the intake conduit 4 sufficiently often to supply the brake booster with vacuum for normal use. However, under certain operating conditions, such as cold starting combined with a high load, it may be necessary to change the operating parameters of the engine in order to create a vacuum for the brake booster should the vacuum be missing or insufficient.

One such operating condition is a cold start of the engine when the emission of pollutants such as HC reaches its highest level. In order to achieve rapid warm-up of a catalytic converter in the exhaust system, it is desirable to increase the load on the engine by leaving the throttle valve open. To avoid disturbing the warm-up cycle unnecessarily, the control unit 10 will stand by for a signal from the sensor 15 on the brake pedal 16. Should the driver actuate the pedal 16, the operating condition of the engine is immediately switched by closing the throttle valve. This will take place within a few tenths of a second and the pressure will then drop very quickly. As an example, for a 5-cylinder engine, 20% of the swept volume of the engine is sucked from the intake conduit per stroke. An idling speed of 1200 rpm during a cold start will correspond to 600 strokes/minute. The time required to build up a vacuum is directly proportional to the volume of the intake conduit after the throttle valve.

A situation of this type may occur when starting the vehicle uphill, or when the driver of a vehicle with automatic transmission actuates the brake before moving the gear selector to the D- or R-position (D- "Drive" R- "Reverse").

After a cold start, the vehicle may be set in motion without the brakes being actuated; but it should be appreciated that the system may also be connected to the ABS-system of the vehicle, as well as the brake pedal. Should the vehicle be braked sufficiently hard to activate the ABS-system, the procedure described above, will come into operation. The vehicle may also be provided with an anti-slip system arranged to prevent one or more of the driving wheels from slipping during start or acceleration, and as a result, vacuum in the brake booster may be required without the brake pedal being actuated. In such a case the throttle valve 18 may be controlled by the control unit 10 in response to signals from the sensors 13 measuring rotational speed of the wheels. In the same way as described above, the throttle valve 18 is immediately closed as soon as the control unit 10 receives a signal from one or more wheel sensors 13 indicating that one or more wheels must be braked.

After a predetermined period of time in a closed or throttled position, the throttle valve 18 will open wholly or in part, depending on both the current parameters from the engine control unit 10 and a signal from the sensor 15 indicating that the brake pedal is sill being actuated. In the latter case, the control unit 10 may switch the engine to provide vacuum in the intake conduit 4 until the signal ceases.

According to an alternative embodiment, the brake booster maybe provided with a pressure sensor that measures the vacuum in the booster. When the vacuum reaches a predetermined limit, the control unit resumes the normal control of the engine. As long as the signal from the brake pedal sensor 15 indicates that the pedal is being actuated, it is necessary to ensure that vacuum is available. This can be achieved by controlling the engine so that there is vacuum in the intake conduit until the signal ceases, or by repeating the procedure of closing the throttle valve 18 every time the sensor indicates insufficient vacuum in the brake booster 19.

Although the above example is mainly intended for use during a cold start of the engine, it may also be applied to other operating conditions. Such a system can provide a back-up function if the vacuum in the brake booster is insufficient for whatever reason. It can, for instance, be used if a sudden leak occurs in the accumulator or if the accumulator has lost its vacuum after a long period of stratified combustion. By using a pressure sensor in the brake booster 19, the vacuum can be monitored by the engine control unit 10. When the brake pedal is actuated, the throttle valve is instantly closed to create a vacuum as described above. This could also be used for providing a warning signal to the driver, indicating a malfunction in the brake system.

A common feature for all embodiments described above is that the engine control system must compensate for the sudden interruption of mass flow of air when the throttle valve closes. In order to avoid misfire and/or unacceptable variations of engine speed, the engine control system will adjust the ignition timing and the fuel injection to suit the current mass flow in the intake conduit.

It is to be understood that the invention is not restricted to the embodiments described above and shown in the drawing, but may be varied within the scope of the appended claims.

What is claimed is:

1. A method for controlling vacuum in an intake conduit of a combustion engine in a vehicle, the method comprising the steps of:

providing the vehicle with a brake booster and an actuator for actuating the brake booster, generating an electrical signal by a brake pedal thereby actuating the brake booster, and causing a throttle valve in the intake conduit to close by actuation of the brake booster thereby creating a vacuum for the brake booster, wherein the electrical signal controls both the brake booster and the throttle valve via a control unit.

2. A method for controlling vacuum in an intake conduit of a combustion engine in a vehicle, the method comprising the steps of:

providing the vehicle with a brake booster and an actuator for actuating the brake booster, actuating the brake booster by an anti-locking system connected to the brakes, causing a throttle valve in the intake conduit to close by actuation of the brake booster thereby creating a vacuum for the brake booster, and continuously performing the vacuum control as long as the brake anti-locking system is active.

3. A method for controlling vacuum in an intake conduit of a combustion engine in a vehicle, the method comprising the steps of:

providing the vehicle with a brake booster, and providing the vehicle with a means for actuating the brake booster, wherein actuation of the brake booster causes a throttle valve in the intake conduit to close in order to create a vacuum for the brake booster, and wherein actuation of the brake booster occurs by means of an electrical signal generated by a brake pedal, which signal controls both the brake booster and the throttle valve via a control unit.

4. The method according to claim 3, wherein actuation of the brake booster occurs by means of a brake pedal.

5. The method according to claim 3, wherein the throttle valve is electrically controlled.

6. The method according to claim 3, wherein the throttle valve opens when the vacuum in the brake booster reaches a predetermined level.

7. The method according to claim 3, wherein the procedure is performed when the engine is running under a high load.

8. The method according to claim 7, wherein the high load is a cold start.

9. The method according to claim 3, wherein the procedure is performed when the vehicle is moving.

10. A method for controlling vacuum in an intake conduit of a combustion engine in a vehicle, the method comprising the steps of:

providing the vehicle with a brake booster, and providing the vehicle with a means for actuating the brake booster, wherein actuation of the brake booster causes a throttle valve in the intake conduit to close in order to create a vacuum for the brake booster, and wherein the brake booster is actuated by an anti-locking system connected to the brakes.

11. The method according to claim 10, wherein the procedure is performed continuously as long as the brake anti-locking system is active.

12. An arrangement for a vehicle, the arrangement comprising:

a throttle valve configured to control a vacuum pulled in an intake conduit of a combustion engine in a vehicle;

a brake booster and actuator configured so that actuation of the brake booster causes the throttle valve in the intake conduit to close thereby creating a vacuum for the brake booster;

a brake pedal configured to serve as the actuator of the brake booster; and an electrical signal generator associated with the brake pedal, the electrical signal generator configured to control the brake booster and the throttle valve via a control unit.

13. The arrangement according to claim 12 wherein the throttle valve is electrically controlled.

14. The arrangement according to claim 12 wherein the throttle valve is configured to open when a vacuum in the brake booster reaches a predetermined level.

15. The arrangement according to claim 12, further comprising an anti-locking system connected to the brakes, wherein the brake booster is configured to be actuated by the anti-locking system.

* * * * *

UNITED STATES PATENT AND TRADEMARK OFFICE
CERTIFICATE OF CORRECTION

PATENT NO. : 6,536,850 B2 Page 1 of 1
DATED : March 25, 2003
INVENTOR(S) : Goran Almkvist et al.

It is certified that error appears in the above-identified patent and that said Letters Patent is hereby corrected as shown below:

<u>Title page, Item [54] and Column 1, line 1,</u>
Title should read -- METHOD FOR CONTROLLING VACUUM --

<u>Title page,</u>
Item [75], the correct city and country of residence of inventor "Olle Fast" is as follows: -- Olle Fast, Ytterby (SE) --
Add Item [30], as follows:

-- Foreign Application Priority Data

[30]  May 15, 2000  (SE) . . . . . . . . . . . .0001759-0 --

Signed and Sealed this

Twenty-ninth Day of July, 2003

JAMES E. ROGAN
*Director of the United States Patent and Trademark Office*